US012803606B2

(12) United States Patent
Shen

(10) Patent No.: US 12,803,606 B2
(45) Date of Patent: Nov. 17, 2026

(54) RADIO FREQUENCY CONTROL METHOD AND APPARATUS AND ELECTRONIC DEVICE

(71) Applicant: VIVO MOBILE COMMUNICATION CO., LTD., Guangdong (CN)

(72) Inventor: Sensong Shen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 414 days.

(21) Appl. No.: 18/428,280

(22) Filed: Jan. 31, 2024

(65) Prior Publication Data

US 2024/0195444 A1 Jun. 13, 2024

Related U.S. Application Data

(63) Continuation of application No. PCT/CN2022/110251, filed on Aug. 4, 2022.

(30) Foreign Application Priority Data

Aug. 5, 2021 (CN) ......................... 202110899164.2

(51) Int. Cl.
*H04B 1/04* (2006.01)
*H04B 1/00* (2006.01)

(52) U.S. Cl.
CPC ......... *H04B 1/0483* (2013.01); *H04B 1/0078* (2013.01); *H04B 2001/0408* (2013.01)

(58) Field of Classification Search
CPC ................ H04B 1/0483; H04B 1/0078; H04B 2001/0408

(Continued)

(56) References Cited

U.S. PATENT DOCUMENTS 8,175,032 B2 * 5/2012 Olfat ................... H04W 72/542 370/332
8,824,584 B2 * 9/2014 Kim ..................... H04B 7/0413 375/267

(Continued)

FOREIGN PATENT DOCUMENTS

CN 104853380 A 8/2015
CN 110212877 A 9/2019

(Continued)

*Primary Examiner* — April G Gonzales
(74) *Attorney, Agent, or Firm* — Price Heneveld LLP

(57) ABSTRACT

A radio frequency control method, applied to an electronic device including a first radio frequency path for transmitting signals in a first frequency band and two second radio frequency paths for transmitting signals in a second frequency band, includes: controlling each second radio frequency path to transmit radio frequency signal; obtaining reference signal received power of the first radio frequency path and a first parameter value of each second radio frequency path, where the first parameter value is a parameter value capable of measuring radio frequency path performance of the second radio frequency path; and when the reference signal received power of the first radio frequency path is greater than a first threshold and the first parameter value of at least one of the second radio frequency paths satisfies a first predetermined condition, controlling a target radio frequency path to switch to the first radio frequency path.

14 Claims, 4 Drawing Sheets

(58) Field of Classification Search
USPC ........................................................ 455/552.1
See application file for complete search history.

(56) References Cited

U.S. PATENT DOCUMENTS 8,983,395 B2 * 3/2015 Luong .................. H04W 24/06 455/67.14
8,983,557 B1 * 3/2015 Sun .................... H04W 52/028 455/574
9,369,189 B2 * 6/2016 Yu ....................... H04B 7/0417
9,750,082 B2 * 8/2017 Zavadsky ............... H04B 7/12
9,930,601 B2 * 3/2018 Wang .................... H04L 1/0026
9,998,188 B2 * 6/2018 Jiang ...................... H04B 7/06
11,284,409 B2 * 3/2022 Nam ..................... H04L 5/0048
11,317,304 B2 * 4/2022 Kapala .................. H04B 17/26
11,490,281 B2 * 11/2022 Zhang .................. H04W 24/10
11,523,344 B2 * 12/2022 Song ................. H04W 52/0222
11,601,308 B2 * 3/2023 Mueck ................. H04B 7/0417
11,606,243 B2 * 3/2023 Pezeshki ................ G06N 20/00
12,058,532 B2 * 8/2024 Pezeshki ................ G06N 20/00
12,167,248 B2 * 12/2024 Damnjanovic ...... H04B 17/336
2008/0198066 A1 * 8/2008 Kang .................. H04L 25/0224 342/174
2008/0316052 A1 * 12/2008 Ruffini .................. H04W 28/18 340/901
2011/0105167 A1 * 5/2011 Pan ...................... H04B 7/0671 455/507
2012/0257516 A1 * 10/2012 Pazhyannur ......... H04B 7/0845 370/252
2013/0023281 A1 * 1/2013 Meredith ...... H04W 36/008375 455/456.1
2013/0040578 A1 * 2/2013 Khoshnevis .......... H04W 72/23 455/67.11
2014/0160955 A1 * 6/2014 Lum ..................... H04W 24/06 370/252
2015/0098419 A1 * 4/2015 Zavadsky ................ H04B 7/12 370/329
2016/0302094 A1 * 10/2016 Yum ..................... H04W 24/10
2016/0337011 A1 * 11/2016 Ying .................... H04B 7/0413
2016/0381589 A1 * 12/2016 Zhang ................. H04L 27/0006 370/252
2017/0214519 A1 * 7/2017 Park .................. H04W 56/0015
2017/0366209 A1 * 12/2017 Weissman ............ H04B 1/0475
2018/0220431 A1 * 8/2018 Nagaraja .............. H04B 7/0408
2018/0295617 A1 * 10/2018 Abdelmonem ...... H04B 1/1036
2018/0295632 A1 * 10/2018 Goodman ............ H04B 1/1036
2018/0309494 A1 * 10/2018 Zhu ...................... H04B 7/0691
2018/0367225 A1 * 12/2018 Li .......................... H04B 17/12
2019/0052344 A1 * 2/2019 Kundargi ............... H04B 17/24
2019/0053072 A1 * 2/2019 Kundargi ............... H04B 17/24
2019/0181926 A1 * 6/2019 Liang ................... H01Q 25/008
2019/0364492 A1 * 11/2019 Azizi .................... H04W 48/16
2020/0127698 A1 * 4/2020 Cho ..................... H04B 1/0057
2020/0162957 A1 * 5/2020 Zhang ................... H04W 24/10
2020/0358511 A1 * 11/2020 Hyung ................. H04B 7/0404
2021/0184753 A1 * 6/2021 Tsai ..................... H04B 7/0617
2021/0194124 A1 * 6/2021 Kim ......................... H01Q 3/36
2021/0288775 A1 * 9/2021 Manolakos ........... H04L 5/0048
2021/0345131 A1 * 11/2021 Pezeshki ................ G06N 20/00
2021/0399814 A1 * 12/2021 Qi .......................... H04B 17/29
2022/0095135 A1 * 3/2022 Kapala ................... H04B 17/26
2022/0123857 A1 * 4/2022 Zhang ................... H04W 76/16
2026/0113063 A1 * 4/2026 Takeuchi ............. H04B 1/0078
2026/0129653 A1 * 5/2026 Banagar ................ H04L 5/1469

FOREIGN PATENT DOCUMENTS

CN 111654316 A 9/2020
CN 113170361 A 7/2021
CN 113691273 A 11/2021
EP 3965474 A1 7/2020
WO 2021004350 A1 1/2021
WO 2021057215 A1 4/2021

* cited by examiner

RADIO FREQUENCY CONTROL METHOD AND APPARATUS AND ELECTRONIC DEVICE

CROSS-REFERENCE TO RELATED APPLICATIONS

This application is a Bypass Continuation Application of PCT International Application No. PCT/CN2022/110251 filed on Aug. 4, 2022, which claims priority to Chinese patent application No. 202110899164.2, filed on Aug. 5, 2021, entitled "RADIO FREQUENCY CONTROL METHOD AND APPARATUS AND ELECTRONIC DEVICE", which are incorporated herein by reference in their entireties.

TECHNICAL FIELD

This application relates to the field of communication technologies, and specifically to a radio frequency control method and apparatus and an electronic device.

BACKGROUND

With greater transmission capacity, higher reliability, and lower latency, 5G can not only meet the continuously growing demand for large-bandwidth mobile Internet in the ToC, but also be able to integrate with multiple services in vertical industries to meet the demand for ToB industry applications such as industrial manufacturing, transportation, energy, and healthcare. As a new-generation digital infrastructure, 5G is becoming a new driving force for economic and social development.

Additionally, with the diversified development of mobile Internet, Internet of Things, cloud storage, intelligent monitoring, and other businesses, there is a rapid growth in the demand for uploading massive amounts of data. Ultra-high-definition video communication, big data collection, intelligent monitoring, AR/VR video streaming, and the like impose high requirements on the performance of 5G, especially in terms of uplink capacity and coverage.

In the related art, to improve the uplink coverage of the 5G radio frequency signal, the radio frequency path of one of the millimeter wave frequency bands is switched to the radio frequency path of the centimeter wave frequency band. However, the path loss of the radio frequency path is easily affected by external environment. For example, in the case of a dual-polarization MIMO scheme, when the vertically polarized signal propagates over a long distance, the direct wave and the ground-reflected wave cancel each other out, causing path loss in the vertically polarized path. The horizontally polarized signal generates polarized current on the earth surface when it is close to the ground, and the polarized current is affected by the earth impedance to generate heat, causing rapid attenuation of the power plant signal and resulting in path loss of the horizontally polarized path. Existing methods do not consider the path loss of each radio frequency path, which may result in switching a radio frequency path with lower path loss while retaining a radio frequency path with higher path loss. This makes it difficult to achieve the desired improvement in uplink coverage and increases the power consumption of electronic devices.

SUMMARY

According to a first aspect, an embodiment of this application provides a radio frequency control method applied to an electronic device, where the electronic device includes a first radio frequency path and two second radio frequency paths for transmitting signals, the first radio frequency path is used to transmit signals in a first frequency band, and the second radio frequency paths is used to transmit signals in a second frequency band, where the first frequency band is different from the second frequency band; and the method includes:

controlling each of the two second radio frequency paths to transmit radio frequency signals;

obtaining reference signal received power of the first radio frequency path and a first parameter value of each of the second radio frequency paths, where the first parameter value is a parameter value capable of measuring radio frequency path performance of the second radio frequency path; and in a case where the reference signal received power of the first radio frequency path is greater than a first threshold and the first parameter value of at least one of the second radio frequency paths satisfies a first predetermined condition, controlling a target radio frequency path to switch to the first radio frequency path, where the target radio frequency path is a radio frequency path with poorer radio frequency path performance in the two second radio frequency paths.

According to a second aspect, an embodiment of this application provides a radio frequency control apparatus applied to an electronic device, where the electronic device includes a first radio frequency path and two second radio frequency paths for transmitting signals, the first radio frequency path is used to transmit signals in a first frequency band, and the second radio frequency paths is used to transmit signals in a second frequency band, where the first frequency band is different from the second frequency band; and the apparatus includes:

a control module configured to control each of the two second radio frequency paths to transmit radio frequency signals;

an obtaining module configured to obtain reference signal received power of the first radio frequency path and a first parameter value of each of the second radio frequency paths, where the first parameter value is a parameter value capable of measuring radio frequency path performance of the second radio frequency path; and a switching module configured to: in a case where the reference signal received power of the first radio frequency path is greater than a first threshold and the first parameter value of at least one of the second radio frequency paths satisfies a first predetermined condition, control a target radio frequency path to switch to the first radio frequency path, where the target radio frequency path is a radio frequency path with poorer radio frequency path performance in the two second radio frequency paths.

According to a third aspect, an embodiment of this application provides an electronic device, where the electronic device includes a processor, a memory, and a program or instructions stored in the memory and capable of running on the processor, and when the program or instructions are executed by the processor, the steps of the method according to the first aspect are implemented.

According to a fourth aspect, an embodiment of this application provides a readable storage medium, where a program or instructions are stored in the readable storage medium, and when the program or instructions are executed by a processor, the steps of the method according to the first aspect are implemented.

According to a fifth aspect, an embodiment of this application provides a chip, where the chip includes a processor and a communication interface, the communication interface is coupled to the processor, and the processor is configured to run a program or instructions so as to implement the method according to the first aspect.

DETAILED DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that terms used in this way is used interchangeably in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates that the associated objects have an "or" relationship.

Before introduction of a radio frequency control method provided in embodiments of this application, an electronic device to which the radio frequency control method is applied is first introduced.

Figure 1:
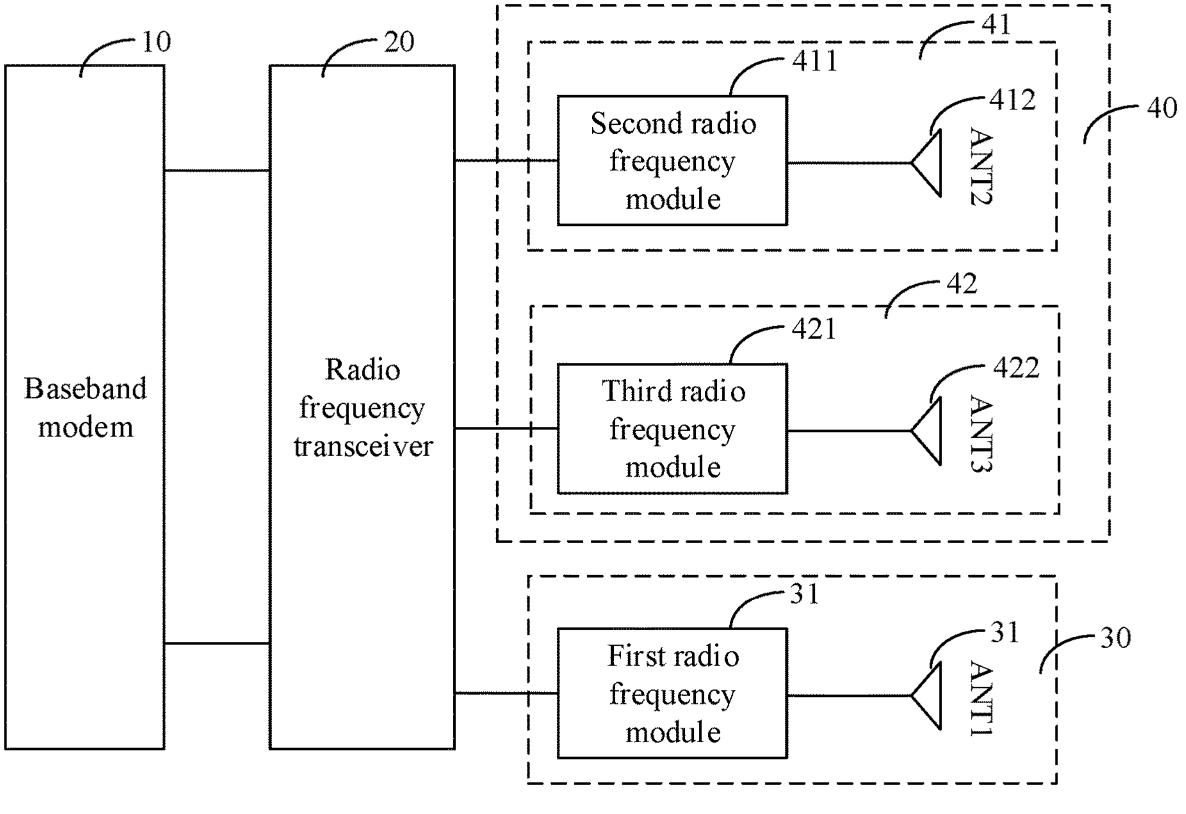
FIG. 1 is a schematic structural diagram of a radio frequency architecture according to an embodiment of this application.

Referring to FIG. 1, the radio frequency circuitry of the electronic device may include a baseband modem 10, a radio frequency transceiver 20, and a first radio frequency path 30 and two second radio frequency paths 40 for transmitting signals. The first radio frequency path 30 may include a first radio frequency module 31 and a first antenna 32. The two second radio frequency paths 40 are specifically a first polarized path 41 and a second polarized path 42, where the first polarized path 41 includes a second radio frequency module 411 and a second antenna 412, and the second polarized path 42 includes a third radio frequency module 421 and a third antenna 422. The first radio frequency path 30 is used for transmitting signals in a first frequency band and the second radio frequency path 40 is used for transmitting signals in a second frequency band, the first frequency band being different from the second frequency band.

For example, the first frequency band corresponding to the first radio frequency path 30 may be a centimeter wave (CMW) frequency band, and the centimeter wave frequency band may be, for example, a B3 frequency band or a B8 frequency band, or the centimeter wave frequency band may be, for example, an n3 frequency band or an n8 frequency band. The second frequency band corresponding to the second radio frequency path 40 may be a millimeter wave (mm Wave) frequency band, and the millimeter wave frequency band may be, for example, an n258 frequency band.

In addition, dual-polarization MIMO schemes are widely used in millimeter wave mobile communication, and in the dual-polarization MIMO schemes, the two second radio frequency paths are a vertically polarized path and a horizontally polarized path. For example, the first polarized path may be a vertically polarized path, and the second polarized path may be a horizontally polarized path. Also for example, the first polarized path may be a horizontally polarized path, and the second polarized path may be a vertically polarized path.

The electronic device may operate in an NSA non-standalone (NSA) networking scenario or in a Standalone (SA) standalone networking scenario. In the standalone networking SA, the electronic device only needs to be connected to a 5G base station. In the non-standalone networking NSA, the implementation involves a dual connection scenario of Long Term Evolution (LTE) and New Radio (NR) to ensure simultaneous operation of LTE and NR.

Specifically, the working process of the radio frequency architecture includes: in the NSA non-standalone networking scenario, the first radio frequency path 30 transmits signals in the first frequency band, and one of the second radio frequency paths 40 transmits signals in the second frequency band, resulting in the electronic device operating in the ENDC working state. In the SA standalone networking scenario, the two second radio frequency paths 40 simultaneously transmit signals in the second frequency band, resulting in the electronic device operating in the 2*2 UL MIMO working state.

In some embodiments, the electronic device may be a terminal device that supports 5G NG UL Carrier Aggregation (CA) technology. The CA technology can aggregate spectrum resources of the same frequency band or different frequency bands for use by the terminal, thereby enhancing the resource utilization rate of the entire network.

Specifically, for signals in the second frequency band, that is, millimeter wave frequency band signals, the frequency is higher, and the transmission rate is higher. However, due to significant path loss during transmission, the coverage performance is poorer. For signals in the first frequency band, that is, centimeter wave frequency band signals, the frequency is lower and the transmission rate is lower. However, due to small path loss during transmission, the coverage performance is better. Based on this, when the coverage of signals in the second frequency band is poor, one of the second radio frequency paths 40 can be selected based on their performance to switch to the first radio frequency path 30. In this case, one of the second radio frequency paths 40 transmits signals in the second frequency band, while the first radio frequency path transmits signals in the first frequency band, resulting in the electronic device operating in the mmWave+CMW UL CA working state to ensure uplink coverage of 5G NR radio frequency signals.

The following specifically describes the radio frequency control method provided in the embodiments of this application through specific embodiments and application scenarios thereof with reference to the accompanying drawings.

Figure 2:
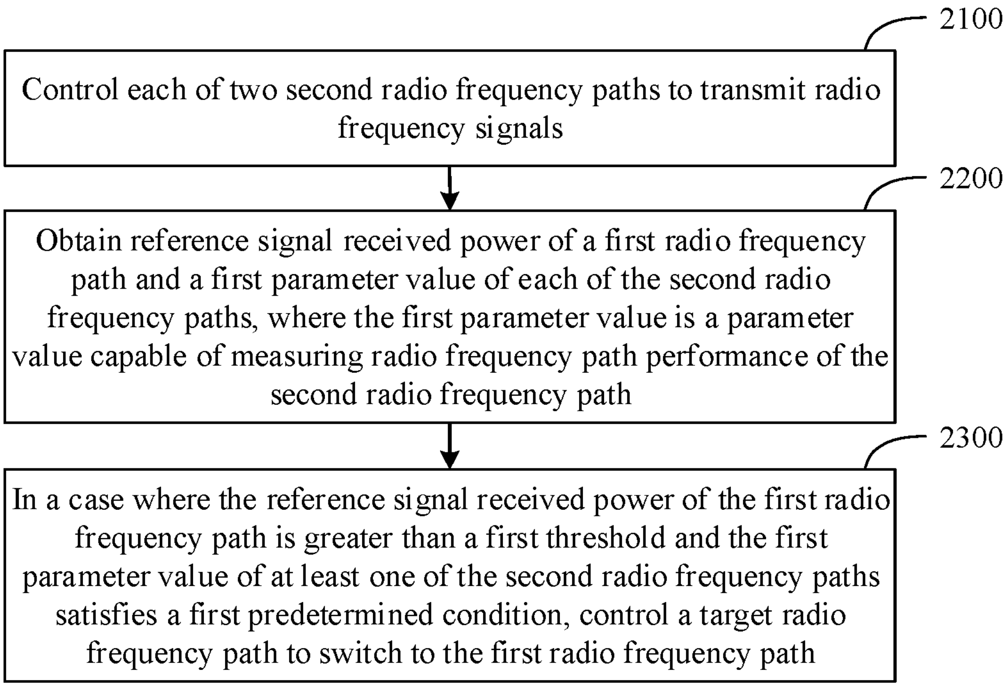
FIG. 2 is a schematic flowchart of a radio frequency control method according to an embodiment of this application.

Refer to FIG. 2, which is a flowchart of a radio frequency control method according to an embodiment of this application. The method may be applied to an electronic device of the preceding embodiment. The electronic device may be a mobile phone, tablet, laptop, and the like. The electronic device includes a first radio frequency path and two second radio frequency paths for transmitting signals, the first radio frequency path is used to transmit signals in a first frequency band, and the second radio frequency paths is used to transmit signals in a second frequency band, where the first frequency band is different from the second frequency band. As shown in FIG. 2, the method may include step 2100 to step 2300, which are described in detail below.

Step 2100. Control each of the two second radio frequency paths to transmit radio frequency signals.

The first frequency band corresponding to the first radio frequency path may be a centimeter wave (CMW) frequency band, and the centimeter wave frequency band may be, for example, a B3 frequency band or a B8 frequency band, or the centimeter wave frequency band may be, for example, an n3 frequency band or an n8 frequency band. The second frequency band corresponding to the second radio frequency path may be a millimeter wave (mm Wave) frequency band, and the millimeter wave frequency band may be, for example, an n258 frequency band.

In this embodiment, the electronic device is controlled to operate in the 2*2 UL MIMO working state. In the 2*2 UL MIMO working state, the two second radio frequency paths are simultaneously in the transmitting state, and the two second radio frequency paths are used to transmit signals in the second frequency band (millimeter wave frequency band). Based on the radio frequency signals transmitted by the two second radio frequency paths, the path loss of the two second radio frequency paths can be determined. Combined with the subsequent steps, the radio frequency path performance of the two second radio frequency paths can be further determined, and one of the second radio frequency paths can be selected to switch to the first radio frequency path to ensure the uplink coverage of 5G NR radio frequency signals.

It should be noted that the default working state of the electronic device can be the 2*2 UL MIMO working state, where both of the two second radio frequency paths are in the transmitting state when the electronic device is powered on.

Step 2200. Obtain reference signal received power of a first radio frequency path and a first parameter value of each of the second radio frequency paths, where the first parameter value is a parameter value capable of measuring radio frequency path performance of the second radio frequency path.

The reference signal received power (RSRP) may reflect the coverage performance of the radio frequency signal. A smaller reference signal received power means poorer coverage performance of the radio frequency signal, while a larger reference signal received power means better coverage performance of the radio frequency signal.

Based on the reference signal received power of the first radio frequency path, the coverage performance of the signal in the first frequency band can be determined, thereby determining whether the first radio frequency path meets the switching condition.

The radio frequency path performance is influenced by the path loss and transmit capability of the radio frequency path. If the path loss level of the radio frequency path is low and the transmit capability of the radio frequency path is good, it means that the radio frequency path has good radio frequency path performance. Conversely, if the path loss level of the radio frequency path is high and the transmit capability is poor, it means that the radio frequency path has poor radio frequency path performance. The first parameter value can measure the radio frequency path performance of the second radio frequency paths. Based on this, the radio frequency path performance of the two second radio frequency paths can be determined according to the first parameter value, thereby identifying which second radio frequency path meets the switching condition.

In some embodiments of this application, the obtaining a first parameter value of each of the second radio frequency paths may further include step 3100 and step 3200.

Step 3100. Obtain a first power margin of the electronic device in the second frequency band, and a second parameter value of each of the second radio frequency paths. The second parameter value is a parameter value measuring a path loss level of the second radio frequency path.

Dual-polarization MIMO schemes are widely used in millimeter wave mobile communications, and in the dual-polarization MIMO schemes, a radio frequency architecture includes a vertically polarized path and a horizontally polarized path. The path loss of the radio frequency path is affected by external environment. For example, when the vertically polarized signal propagates over a long distance, the direct wave and the ground-reflected wave cancel each other out, causing path loss in the vertically polarized path. For another example, the horizontally polarized signal generates polarized current on the earth surface when it is close to the ground, and the polarized current is affected by the earth impedance to generate heat, causing rapid attenuation of the power plant signal and resulting in path loss of the horizontally polarized path. In other words, due to the influence of the external environment, there may be a large difference in path loss between the vertically polarized path and the horizontally polarized path. In addition, the two second radio frequency paths have different transmit power margins, which means that the two second radio frequency paths have different transmit capabilities. Based on this, the path loss of the second radio frequency path can be determined according to the second parameter value of the second radio frequency path, so as to determine the target radio frequency path based on the path loss and transmit capability of the second radio frequency path.

The second parameter value may measure a path loss level of the second radio frequency path. For example, the second parameter value of the second radio frequency path may be downlink reference signal received power of the second radio frequency path. The second parameter value of the second radio frequency path may alternatively be uplink sounding signal received power of the second radio frequency path.

In an optional embodiment, the obtaining a second parameter value of each of the second radio frequency paths may be obtaining downlink reference signal received power of each of the second radio frequency paths.

The downlink reference signal received power of the second radio frequency path is an RSRP value of the second radio frequency path. The downlink reference signal received power of the second radio frequency path may reflect the coverage performance of the radio frequency signal. A smaller downlink reference signal received power means poorer coverage performance of the radio frequency signal in the second frequency band, while a larger downlink reference signal received power means better coverage performance of the radio frequency signal in the second frequency band.

For example, in a case where the two second radio frequency paths are a first polarized path and a second polarized path, the obtaining downlink reference signal received power of each of the second radio frequency paths may be obtaining downlink reference signal received power of the first polarized path and the second polarized path separately.

In another optional embodiment, the obtaining a second parameter value of each of the second radio frequency paths may be obtaining uplink sounding signal received power of each of the second radio frequency paths.

The uplink sounding signal received power of the second radio frequency path is an SRS value of the second radio frequency path. The uplink sounding signal received power of the second radio frequency path may reflect the coverage performance of the radio frequency signal. A smaller uplink sounding signal received power means poorer coverage performance of the radio frequency signal in the second frequency band, while a larger uplink sounding signal received power means better coverage performance of the radio frequency signal in the second frequency band.

For example, in a case where the two second radio frequency paths are a first polarized path and a second polarized path, the obtaining uplink sounding signal received power of each of the second radio frequency paths may be obtaining uplink sounding signal received power of the first polarized path and the second polarized path separately.

In this embodiment, a plurality of methods for detecting the path loss level of the second radio frequency path are provided. The path loss level of the second radio frequency path can be determined by detecting the RSRP value of the second radio frequency path or by transmitting an SRS uplink sounding signal to determine the path loss level of the second radio frequency path based on a signal reported by a base station.

The first power margin of the electronic device in the second frequency band may reflect a difference in transmit power margin between the two second radio frequency paths. The first power margin of the electronic device in the second frequency band may be a difference in power margin between the two second radio frequency paths.

In this embodiment, the first parameter value of the second radio frequency path is determined based on the second parameter value reflecting the path loss level and the first power margin. This can comprehensively take into account the path loss and the transmission ability of the second radio frequency path, thereby accurately measuring the radio frequency path performance of each of the second radio frequency paths.

In some optional embodiments, the two second radio frequency paths are a first polarized path and a second polarized path; and the obtaining a first power margin of the electronic device in the second frequency band may further include step 4100 to step 4200.

Step 4100. Obtain a second power margin of the first polarized path and a third power margin of the second polarized path.

The second power margin may be a transmit power margin of the first polarized path. The second power margin may reflect transmit performance of the first polarized path.

The third power margin may be a transmit power margin of the second polarized path. The third power margin may reflect transmit performance of the second polarized path.

Step 4200. Use a difference between the second power margin and the third power margin as the first power margin of the electronic device in the second frequency band.

The first power margin may reflect a difference in the transmit power margin between the first polarized path and the second polarized path. In other words, the first power margin may reflect a difference in transmit capabilities between the first polarized path and the second polarized path, indicating performance of the transmission capabilities of the two second radio frequency paths.

In this embodiment, the first power margin can reflect the difference in the transmit power margin between the two second radio frequency paths. Based on this, the first parameter value of the second radio frequency path can be quickly determined based on the first power margin and the second parameter value of the second radio frequency path, reducing the computational load and improving the detection efficiency.

After step 3100, step 3200 is performed: obtaining a first parameter value of each of the second radio frequency paths based on the first power margin and the second parameter value of each of the second radio frequency paths.

In this embodiment, the first parameter value of the second radio frequency path is determined based on the first power margin and the second parameter value of the second radio frequency path. This can comprehensively take into account the transmit power margin and the second parameter value of the second radio frequency path, thereby accurately determining the radio frequency path performance of each of the second radio frequency paths.

In some optional embodiments, the two second radio frequency paths are a first polarized path and a second polarized path; and the obtaining a first parameter value of each of the second radio frequency paths based on the first power margin and the second parameter value of each of the second radio frequency paths may further include step 5100 and step 5200.

Step 5100. Use a sum of the second parameter value of the first polarized path and the first power margin as the first parameter value of the first polarized path.

Step 5200. Use the second parameter value of the second polarized path as the first parameter value of the second polarized path.

In this embodiment, the first polarized path may be a vertically polarized path or a horizontally polarized path, and correspondingly, the second polarized path may be a horizontally polarized path or a vertically polarized path.

The second parameter value being the downlink reference signal received power is used as an example. Specifically, in a case where the first polarized path is a vertically polarized path and the second polarized path is a horizontally polarized path, the first power margin ($P_d$) is determined based on a difference between the vertically polarized path and the horizontally polarized path. An RSRP value of the vertically polarized path is obtained and denoted as RSRP-$V_0$, and an RSRP value of the horizontally polarized path is obtained and denoted as RSRP-$H_0$. In this case, a sum of the RSRP value of the vertically polarized path (RSRP-$V_0$) and the first power margin ($P_d$) is used as the first parameter value of the vertically polarized path, denoted as RSRP-V. An RSRP value of the horizontally polarized path (RSRP-$H_0$) is used as the first parameter value of the horizontally polarized path, denoted as RSRP-H.

Specifically, in a case where the first polarized path is a horizontally polarized path and the second polarized path is a vertically polarized path, the first power margin ($P_d$) is determined based on a difference between the horizontally polarized path and the vertically polarized path. An RSRP value of the horizontally polarized path is obtained and denoted as RSRP-$H_0$, and an RSRP value of the vertically polarized path is obtained and denoted as RSRP-$V_0$. In this case, a sum of the RSRP value of the horizontally polarized path (RSRP-$H_0$) and the first power margin ($P_d$) is used as the first parameter value of the horizontally polarized path, denoted as RSRP-H. An RSRP value of the vertically polarized path (RSRP-$V_0$) is used as the first parameter value of the vertically polarized path, denoted as RSRP-V.

The second parameter value being the uplink sounding signal received power is used as an example. Specifically, in a case where the first polarized path is a vertically polarized path and the second polarized path is a horizontally polarized path, the first power margin ($P_d$) is determined based on a difference between the vertically polarized path and the horizontally polarized path. An SRS power value of the vertically polarized path is obtained and denoted as SRS-$V_0$, and an SRS power value of the horizontally polarized path is obtained and denoted as SRS-$H_0$. In this case, a sum of the SRS power value of the vertically polarized path (SRS-$V_0$) and the first power margin ($P_d$) is used as the first parameter value of the vertically polarized path, denoted as SRS-V. An SRS power value of the horizontally polarized path (SRS-$H_0$) is used as the first parameter value of the horizontally polarized path, denoted as SRS-H.

Specifically, in a case where the first polarized path is a horizontally polarized path and the second polarized path is a vertically polarized path, the first power margin ($P_d$) is determined based on a difference between the horizontally polarized path and the vertically polarized path. An SRS power value of the horizontally polarized path is obtained and denoted as SRS-$H_0$, and an SRS power value of the vertically polarized path is obtained and denoted as SRS-$V_0$. In this case, a sum of the SRS power value of the horizontally polarized path (SRS-$H_0$) and the first power margin ($P_d$) is used as the first parameter value of the horizontally polarized path, denoted as SRS-H. An SRS power value of the vertically polarized path (SRS-$V_0$) is used as the first parameter value of the vertically polarized path, denoted as SRS-V.

In some other optional embodiments, the two second radio frequency paths are a first polarized path and a second polarized path; and the obtaining a first parameter value of each of the second radio frequency paths based on the first power margin and the second parameter value of each of the second radio frequency paths may further include step 6100 and step 6200.

Step 6100. Use the second parameter value of the first polarized path as the first parameter value of the first polarized path.

Step 6200. Use a difference between the second parameter value of the second polarized path and the first power margin as the first parameter value of the second polarized path.

In this embodiment, the first polarized path may be a vertically polarized path or a horizontally polarized path, and correspondingly, the second polarized path may be a horizontally polarized path or a vertically polarized path.

The second parameter value being the downlink reference signal received power is used as an example. Specifically, in a case where the first polarized path is a vertically polarized path and the second polarized path is a horizontally polarized path, the first power margin ($P_d$) is determined based on a difference between the vertically polarized path and the horizontally polarized path. An RSRP value of the vertically polarized path is obtained and denoted as RSRP-$V_0$, and an RSRP value of the horizontally polarized path is obtained and denoted as RSRP-$H_0$. In this case, an RSRP value of the vertically polarized path (RSRP-$V_0$) is used as the first parameter value of the vertically polarized path, denoted as RSRP-V. A difference between the RSRP value of the horizontally polarized path (RSRP-$H_0$) and the first power margin ($P_d$) is used as the first parameter value of the horizontally polarized path, denoted as RSRP-H.

Specifically, in a case where the first polarized path is a horizontally polarized path and the second polarized path is a vertically polarized path, the first power margin ($P_d$) is determined based on a difference between the horizontally polarized path and the vertically polarized path. An RSRP value of the horizontally polarized path is obtained and denoted as RSRP-$H_0$, and an RSRP value of the vertically polarized path is obtained and denoted as RSRP-$V_0$. In this case, an RSRP value of the horizontally polarized path (RSRP-$H_0$) is used as the first parameter value of the horizontally polarized path, denoted as RSRP-H. A difference between the RSRP value of the vertically polarized path (RSRP-$V_0$) and the first power margin ($P_d$) is used as the first parameter value of the vertically polarized path, denoted as RSRP-V.

The second parameter value being the uplink sounding signal received power is used as an example. Specifically, in a case where the first polarized path is a vertically polarized path and the second polarized path is a horizontally polarized path, the first power margin ($P_d$) is determined based on a difference between the vertically polarized path and the horizontally polarized path. An SRS power value of the vertically polarized path is obtained and denoted as SRS-$V_0$, and an SRS power value of the horizontally polarized path is obtained and denoted as SRS-$H_0$. In this case, an SRS power value of the vertically polarized path (SRS-$V_0$) is used as the first parameter value of the vertically polarized path, denoted as SRS-V. A difference between the SRS power value of the horizontally polarized path (SRS-$H_0$) and the first power margin ($P_d$) is used as the first parameter value of the horizontally polarized path, denoted as SRS-H.

Specifically, in a case where the first polarized path is a horizontally polarized path and the second polarized path is a vertically polarized path, the first power margin ($P_d$) is determined based on a difference between the horizontally polarized path and the vertically polarized path. An SRS power value of the horizontally polarized path is obtained and denoted as SRS-$H_0$, and an SRS power value of the vertically polarized path is obtained and denoted as SRS-$V_0$. In this case, an SRS power value of the horizontally polarized path (SRS-$H_0$) is used as the first parameter value of the horizontally polarized path, denoted as SRS-H. A difference between the SRS power value of the vertically polarized path (SRS-$V_0$) and the first power margin ($P_d$) is used as the first parameter value of the vertically polarized path, denoted as SRS-V.

In this embodiment, the path loss level of the second radio frequency path can be determined by detecting the RSRP value of the second radio frequency path or by transmitting an SRS uplink sounding signal to determine the path loss level of the second radio frequency path based on a signal reported by a base station. A plurality of more flexible methods for detecting the path loss level of the second radio frequency path are provided. After step 2200, step 2300 is performed. In a case where the reference signal received power of the first radio frequency path is greater than a first threshold and the first parameter value of at least one of the second radio frequency paths satisfies a first predetermined condition, a target radio frequency path is controlled to switch to the first radio frequency path, where the target radio frequency path is a radio frequency path with poorer radio frequency path performance in the two second radio frequency paths.

The first threshold may measure whether the coverage performance of the signal in the first frequency band satisfies the switching condition, that is, whether the coverage performance of the signal in the centimeter wave frequency band satisfies the switching condition. In a case where the reference signal received power of the first radio frequency path is greater than the first threshold, it indicates that the coverage performance of the electronic device in the first network frequency band is good. The first threshold may be set according to the test results, which is not limited by embodiments of this application.

The first predetermined condition is used to determine whether the second radio frequency path satisfies the switching condition.

In some embodiments of this application, that the first parameter value of at least one of the second radio frequency paths satisfies a first predetermined condition includes: the first parameter value of the at least one of the second radio frequency paths is less than a second threshold.

The second threshold may reflect whether the coverage performance of the signal of the second channel becomes worse. The second threshold may be set according to the manner of determining the first parameter value, which is not limited by embodiments of this application.

It can be understood that in the case where the second radio frequency path includes the first polarized path and the second polarized path, the first parameter value of at least one second radio frequency path is less than the second threshold, and it may be that the first parameter value of the first polarized path and/or the second polarized path is less than the second threshold.

That the first parameter value of at least one second radio frequency path is less than the second threshold may be that the first parameter value of the at least one of the second radio frequency paths is always less than the second threshold for a predetermined time. According to the above description, in a case where the reference signal received power of the first radio frequency path is greater than the first threshold and the first parameter value of the at least one of the second radio frequency paths satisfies the first predetermined condition, it means that the coverage performance of the signals in the second frequency band of the electronic device is poor, while the coverage performance of the signals in the first frequency band is better, that is, the channel switching condition is satisfied. In this case, one of the second radio frequency paths may be switched to the first radio frequency path.

Further, the two second radio frequency paths are compared in terms of the radio frequency path performance. The path with the poorer radio frequency path performance in the two second radio frequency paths is taken as the target radio frequency path, and the target path is switched to the first radio frequency path.

In this embodiment, with the radio frequency path performance of both the two second radio frequency paths considered, whether the coverage performance of the radio frequency signals in the second frequency band deteriorates can be accurately determined, and thus whether the second radio frequency path satisfies the switching condition can be accurately determined. In addition, the radio frequency path performance of the second radio frequency path can be measured based on the change of the first parameter value of the second radio frequency path within a certain period. This can reduce the detection error and further improve the accuracy of the detection.

In some embodiments, determining a target radio frequency path may include: comparing first parameter values of the two second radio frequency paths, and taking the one with the smaller first parameter value as the target radio frequency path.

The first parameter value is a parameter value that can measure the radio frequency path performance of the second radio frequency path. The process of determining the first parameter values of the two second radio frequency paths is as described in the preceding embodiments and is not repeated herein.

The downlink reference signal received power being detected is used as an example. The first parameter value of the vertically polarized path is obtained and denoted as RSRP-V, and the first parameter value of the horizontally polarized path is obtained and denoted as RSRP-H. In a case where the RSRP-V of the vertically polarized path is less than the RSRP-H of the horizontally polarized path, indicating that the radio frequency path performance of the vertically polarized path is poor, the vertically polarized path is used as the target radio frequency path and the target radio frequency path is switched to the first radio frequency path; in a case where the RSRP-V of the vertically polarized path is greater than the RSRP-H of the horizontally polarized path, indicating that the radio frequency path performance of the horizontally polarized path is poor, the horizontally polarized path is used as the target radio frequency path, and the target radio frequency path is switched to the first radio frequency path.

For example, in the case of detecting the uplink sounding signal received power, the first parameter value of the vertically polarized path is obtained and denoted as SRS-V, and the first parameter value of the horizontally polarized path is obtained and denoted as SRS-H. In a case where the SRS-V of the vertically polarized path is less than the SRS-H of the horizontally polarized path, indicating that the radio frequency path performance of the vertically polarized path is poor, the vertically polarized path is used as the target radio frequency path and the target radio frequency path is switched to the first radio frequency path; in a case where the SRS-V of the vertically polarized path is greater than the SRS-H of the horizontally polarized path, indicating that the radio frequency path performance of the horizontally polarized path is poor, the horizontally polarized path is used as the target radio frequency path, and the target radio frequency path is switched to the first radio frequency path.

In the embodiments of this application, each of two second radio frequency paths is controlled to transmit a radio frequency signal, and in the case where reference signal received power of a first radio frequency path is greater than a first threshold and a first parameter value of at least one of the second radio frequency paths satisfies a first predetermined condition, a radio frequency path with poorer radio frequency path performance in the two second radio frequency paths is taken as a target radio frequency path, and the target radio frequency path is controlled to switch to the first radio frequency path. In this method, in a case where coverage performance of signals in the second frequency band is poorer and coverage performance of signals in the first frequency band is better, one of the second radio frequency paths corresponding to the second frequency band is switched to a first radio frequency path corresponding to the first frequency band. Furthermore, by comprehensively considering the path loss levels and transmit power margins of the two second radio frequency paths, the radio frequency path with poorer radio frequency path performance in the two second radio frequency paths is switched to the first radio frequency path. This ensures the uplink coverage of 5G NR radio frequency signals and can reduce the power consumption of electronic devices, enhancing the overall communication experience.

It should be noted that the radio frequency control method provided in this embodiment of this application may be performed by a radio frequency control apparatus or a control module for performing the radio frequency control method in the radio frequency control apparatus. In the embodiments of this application, the radio frequency control apparatus provided in the embodiments of this application is described by using an example in which a radio frequency control apparatus performs the radio frequency control method.

Figure 3:
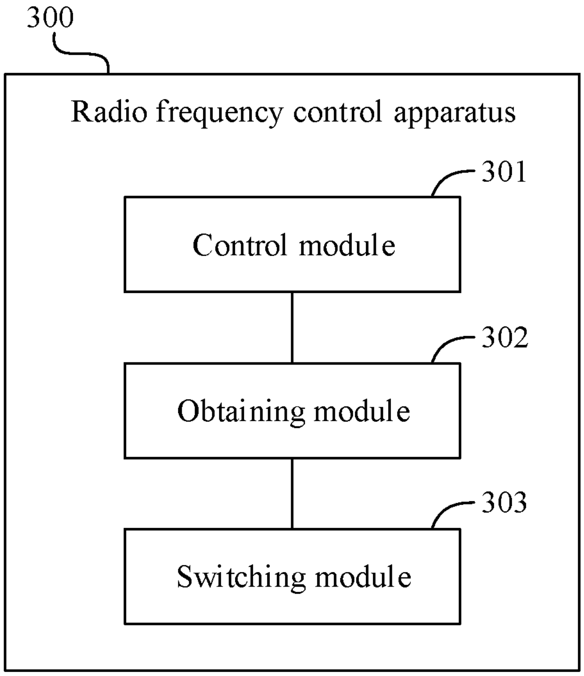
FIG. 3 is a schematic diagram of a hardware structure of a radio frequency control apparatus according to an embodiment of this application.

Corresponding to the foregoing embodiment, as shown in FIG. 3, an embodiment of this application further provides a radio frequency control apparatus 300 applied to an electronic device. The electronic device includes a first radio frequency path and two second radio frequency paths for transmitting signals, the first radio frequency path is used to transmit signals in a first frequency band, and the second radio frequency paths is used to transmit signals in a second frequency band, where the first frequency band is different from the second frequency band; and the method includes: The radio frequency control apparatus 300 includes a control module 301, an obtaining module 302 and a switching module 303.

The control module 301 is configured to control each of the two second radio frequency paths to transmit radio frequency signals.

The obtaining module 302 is configured to obtain reference signal received power of the first radio frequency path and a first parameter value of each of the second radio frequency paths, where the first parameter value is a parameter value capable of measuring radio frequency path performance of the second radio frequency path.

The switching module 303 is configured to: in a case where the reference signal received power of the first radio frequency path is greater than a first threshold and the first parameter value of at least one of the second radio frequency paths satisfies a first predetermined condition, control a target radio frequency path to switch to the first radio frequency path, where the target radio frequency path is a radio frequency path with poorer radio frequency path performance in the two second radio frequency paths.

In some embodiments, that the first parameter value of at least one of the second radio frequency paths satisfies a first predetermined condition includes: the first parameter value of the at least one of the second radio frequency paths is less than a second threshold.

In some embodiments, the obtaining module includes an obtaining unit configured to obtain a first power margin of the electronic device in the second frequency band, and a second parameter value of each of the second radio frequency paths, where the second parameter value is a parameter value measuring a path loss level of the second radio frequency path; and a determining unit configured to obtain a first parameter value of each of the second radio frequency paths based on the first power margin and the second parameter value of each of the second radio frequency paths; where the second parameter value of the second radio frequency path includes at least one of the following: downlink reference signal received power of the second radio frequency path; or uplink sounding signal received power of the second radio frequency path.

In some embodiments, the two second radio frequency paths are a first polarized path and a second polarized path; and the determining unit includes: a first determining sub-unit configured to use a sum of the second parameter value of the first polarized path and the first power margin as the first parameter value of the first polarized path; and a second determining sub-unit configured to use the second parameter value of the second polarized path as the first parameter value of the second polarized path.

In some embodiments, the two second radio frequency paths are a first polarized path and a second polarized path; and the determining unit includes: a third determining sub-unit configured to use the second parameter value of the first polarized path as the first parameter value of the first polarized path; and a fourth determining sub-unit configured to use a difference between the second parameter value of the second polarized path and the first power margin as the first parameter value of the second polarized path.

In some embodiments, the two second radio frequency paths are a first polarized path and a second polarized path; and the obtaining unit is specifically configured to: obtain a second power margin of the first polarized path and a third power margin of the second polarized path; and use a difference between the second power margin and the third power margin as the first power margin of the electronic device in the second frequency band.

In the embodiments of this application, each of two second radio frequency paths is controlled to transmit a radio frequency signal, and in the case where reference signal received power of a first radio frequency path is greater than a first threshold and a first parameter value of at least one of the second radio frequency paths satisfies a first predetermined condition, a radio frequency path with poorer radio frequency path performance in the two second radio frequency paths is taken as a target radio frequency path, and the target radio frequency path is controlled to switch to the first radio frequency path. In this method, in a case where coverage performance of signals in the second frequency band is poorer and coverage performance of signals in the first frequency band is better, one of the second radio frequency paths corresponding to the second frequency band is switched to a first radio frequency path corresponding to the first frequency band. Furthermore, by comprehensively considering the path loss levels and transmit power margins of the two second radio frequency paths, the radio frequency path with poorer radio frequency path performance in the two second radio frequency paths is switched to the first radio frequency path. This ensures the uplink coverage of 5G NR radio frequency signals and can reduce the power consumption of electronic devices, enhancing the overall communication experience.

The radio frequency control apparatus in this embodiment of this application may be an apparatus or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, or a personal digital assistant (PDA), and the non-mobile electronic device may be a server, a network attached storage (NAS), a personal computer (PC), a television (TV), a teller machine, a self-service machine, or the like. This is not specifically limited in the embodiments of this application.

The radio frequency control apparatus in this embodiment of this application may be an apparatus with an operating system. The operating system may be an android operating system, iOS operating system, or other possible operating system. This is not specifically limited in the embodiments of this application.

The radio frequency control apparatus provided in this embodiment of this application can implement the processes implemented in the method embodiment in FIG. 2. To avoid repetition, details are not described herein again.

Figure 4:
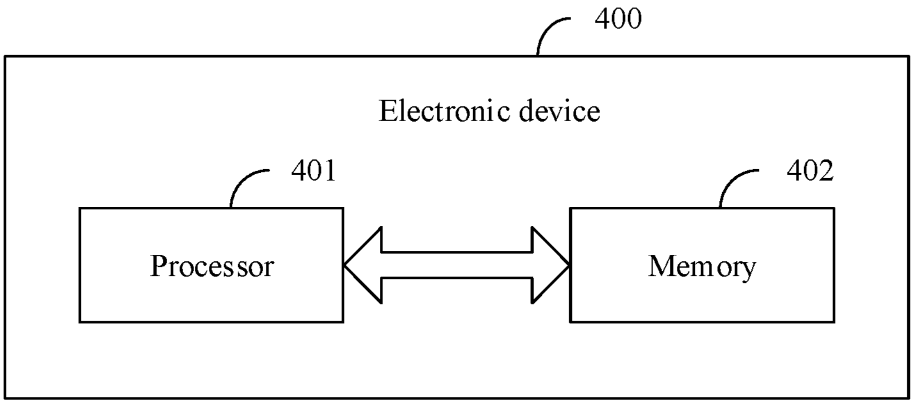
FIG. 4 is a schematic diagram of a hardware structure of an electronic device according to an embodiment of this application.

Corresponding to the foregoing embodiments, optionally, as shown in FIG. 4, an embodiment of this application further provides an electronic device 400, including a processor 401, a memory 402, and a program or instructions stored in the memory 402 and capable of running on the processor 401, where when the program or instructions are executed by the processor 401, the processes of the foregoing radio frequency control method embodiment are implemented, with the same technical effects achieved. To avoid repetition, details are not further described herein.

It should be noted that the electronic device in this embodiment of this application includes the above mentioned mobile electronic device and non-mobile electronic device.

Figure 5:
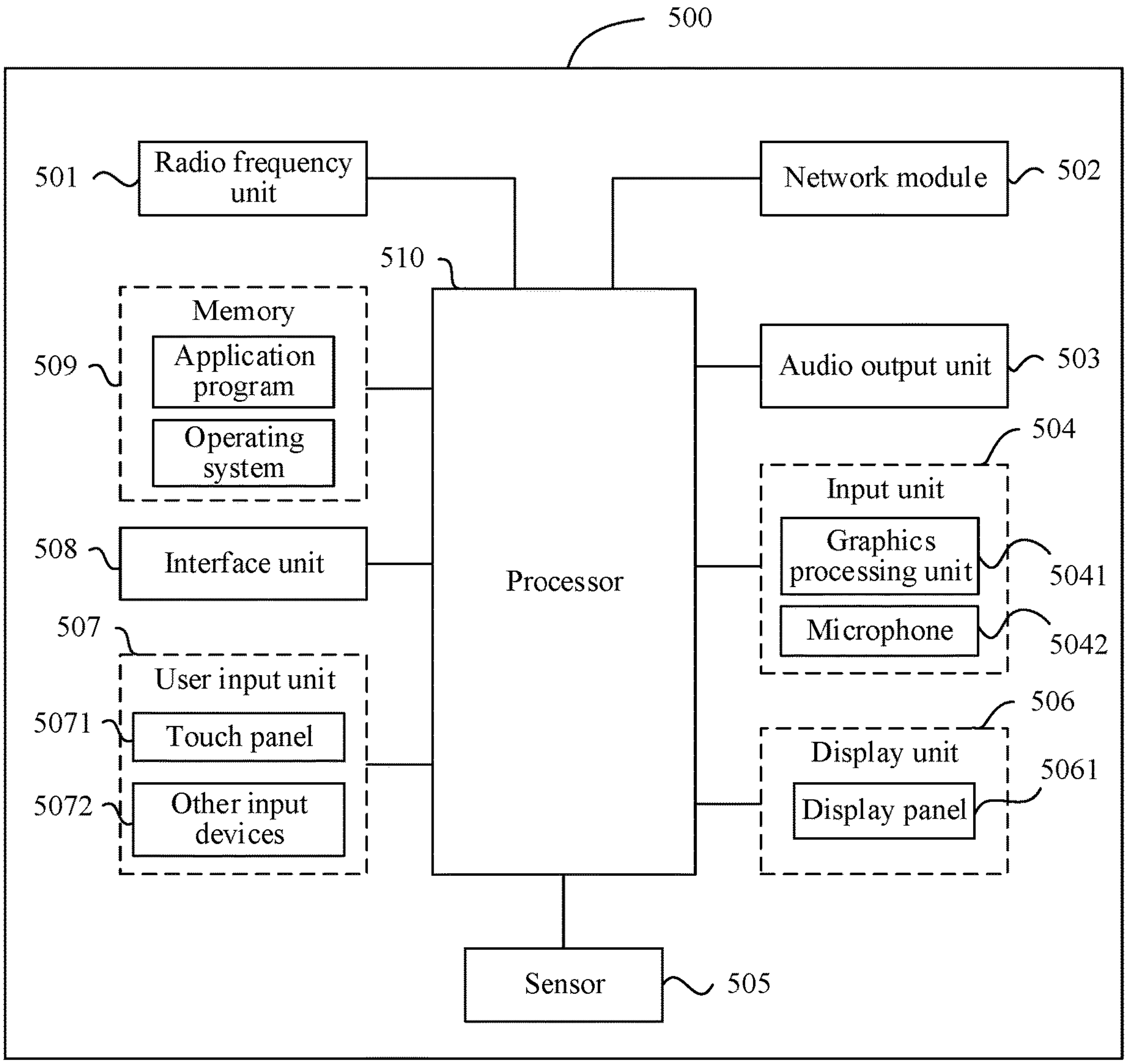
FIG. 5 is a schematic diagram of a hardware structure of another electronic device according to an embodiment of this application.

FIG. 5 is a schematic diagram of a hardware structure of an electronic device according to an embodiment of this application.

The electronic device 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

Those skilled in the art can understand that the electronic device 500 may further include a power supply (for example, a battery) that supplies power to various components. The power supply may be logically connected to the processor 510 through a power management system, so that functions such as charge and discharge management and power consumption management are implemented by using the power management system. The structure of the electronic device shown in FIG. 5 does not constitute a limitation on the electronic device. The electronic device may include more or fewer components than shown in the figure, or some components may be combined, or there may be a different component layout. Details are not described herein again.

The radio frequency unit 501 in the embodiment of this application includes a first radio frequency path and two second radio frequency paths for transmitting signals, the first radio frequency path is used to transmit signals in a first frequency band, and the second radio frequency paths is used to transmit signals in a second frequency band, where the first frequency band is different from the second frequency band.

The processor 510 is configured to control each of the two second radio frequency paths to transmit radio frequency signals; obtain reference signal received power of the first radio frequency path and a first parameter value of each of the second radio frequency paths, where the first parameter value is a parameter value capable of measuring radio frequency path performance of the second radio frequency path; and in a case where the reference signal received power of the first radio frequency path is greater than a first threshold and the first parameter value of at least one of the second radio frequency paths satisfies a first predetermined condition, control a target radio frequency path to switch to the first radio frequency path, where the target radio frequency path is a radio frequency path with poorer radio frequency path performance in the two second radio frequency paths.

Optionally, that the first parameter value of at least one of the second radio frequency paths satisfies a first predetermined condition includes: the first parameter value of the at least one of the second radio frequency paths is less than a second threshold.

Optionally, when obtaining the first parameter value of each of the second radio frequency paths, the processor 510 is configured to obtain a first power margin of the electronic device in the second frequency band, and a second parameter value of each of the second radio frequency paths, where the second parameter value is a parameter value measuring a path loss level of the second radio frequency path; and obtain a first parameter value of each of the second radio frequency paths based on the first power margin and the second parameter value of each of the second radio frequency paths; where the second parameter value of the second radio frequency path includes at least one of the following: downlink reference signal received power of the second radio frequency path; or uplink sounding signal received power of the second radio frequency path.

Optionally, the two second radio frequency paths are a first polarized path and a second polarized path; and when obtaining the first parameter value of each of the second radio frequency paths based on the first power margin and the second parameter value of each of the second radio frequency paths, the processor 510 is configured to use a sum of the second parameter value of the first polarized path and the first power margin as the first parameter value of the first polarized path; and use the second parameter value of the second polarized path as the first parameter value of the second polarized path.

Optionally, the two second radio frequency paths are a first polarized path and a second polarized path; and when obtaining the first parameter value of each of the second radio frequency paths based on the first power margin and the second parameter value of each of the second radio frequency paths, the processor 510 is configured to use the second parameter value of the first polarized path as the first parameter value of the first polarized path; and use a difference between the second parameter value of the second polarized path and the first power margin as the first parameter value of the second polarized path.

Optionally, the two second radio frequency paths are a first polarized path and a second polarized path; and when obtaining the first power margin of the electronic device in the second frequency band, the processor 510 is configured to: obtain a second power margin of the first polarized path and a third power margin of the second polarized path; and use a difference between the second power margin and the third power margin as the first power margin of the electronic device in the second frequency band.

In the embodiments of this application, each of two second radio frequency paths is controlled to transmit a radio frequency signal, and in the case where reference signal received power of a first radio frequency path is greater than a first threshold and a first parameter value of at least one of the second radio frequency paths satisfies a first predetermined condition, a radio frequency path with poorer radio frequency path performance in the two second radio frequency paths is taken as a target radio frequency path, and the target radio frequency path is controlled to switch to the first radio frequency path. In this method, in a case where coverage performance of signals in the second frequency band is poorer and coverage performance of signals in the first frequency band is better, one of the second radio frequency paths corresponding to the second frequency band is switched to a first radio frequency path corresponding to the first frequency band. Furthermore, by comprehensively considering the path loss levels and transmit power margins of the two second radio frequency paths, the radio frequency path with poorer radio frequency path performance in the two second radio frequency paths is switched to the first radio frequency path. This ensures the uplink coverage of 5G NR radio frequency signals and can reduce the power consumption of electronic devices, enhancing the overall communication experience.

It should be understood that in this embodiment of this application, the input unit 504 may include a graphics processing unit (GPU) 5041 and a microphone 5042. The graphics processing unit 5041 processes image data of a static picture or a video that is obtained by an image capture apparatus (for example, a camera) in a video capture mode or an image capture mode. The display unit 506 may include the display panel 5061. The display panel 5061 may be configured in a form of a liquid crystal display, an organic light-emitting diode, or the like. The user input unit 507 includes a touch panel 5071 and other input devices 5072. The touch panel 5071 is also referred to as a touchscreen. The touch panel 5071 may include two parts: a touch detection apparatus and a touch controller. The other input devices 5072 may include but be not limited to a physical keyboard, a function key (such as a volume control key or an on/off key), a trackball, a mouse, and a joystick. Details are not described herein. The memory 509 may be configured to store software programs and various data which include but are not limited to an application program and an operating system. The processor 510 may integrate an application processor and a modem processor. The application processor mainly processes an operating system, a user interface, an application program, and the like. The modem processor mainly processes wireless communication. It can be understood that the modem processor may alternatively be not integrated in the processor 510.

An embodiment of this application further provides a readable storage medium. The readable storage medium stores a program or instructions. When the program or instructions are executed by a processor, each process of the foregoing radio frequency control method embodiment is implemented, with the same technical effect achieved. To avoid repetition, details are not described again herein described herein again.

The processor is the processor in the electronic device in the foregoing embodiments. The readable storage medium includes a computer-readable storage medium, such as a computer read-only memory (ROM), a random access memory (RAM), a magnetic disk, or an optical disc.

An embodiment of this application further provides a chip. The chip includes a processor and a communication interface. The communication interface is coupled to the processor. The processor is configured to run a program or instructions to implement each process of the foregoing radio frequency control method embodiment, with the same technical effect achieved. To avoid repetition, details are not described herein again.

It should be understood that the chip mentioned in the embodiments of this application may also be referred to as a system-level chip, a system chip, a chip system, a system-on-chip, or the like.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

According to the description of the foregoing embodiments, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is an exemplary embodiment. Based on such an understanding, the technical solutions of this application essentially, or the part contributing to the prior art may be implemented in a form of a computer software product. The computer software product is stored in a storage medium (for example, a ROM/RAM, a magnetic disk, or an optical disc), and includes several instructions for instructing a terminal (which may be a mobile phone, a computer, a server, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A radio frequency control method, applied to an electronic device, wherein the electronic device comprises a first radio frequency path and two second radio frequency paths for transmitting signals, the first radio frequency path is used to transmit signals in a first frequency band, and the second radio frequency paths is used to transmit signals in a second frequency band, wherein the first frequency band is different from the second frequency band; and the method comprises:

controlling each of the two second radio frequency paths to transmit radio frequency signals;

obtaining reference signal received power of the first radio frequency path and a first parameter value of each of the second radio frequency paths, wherein the first parameter value is a parameter value capable of measuring radio frequency path performance of the second radio frequency path; and in a case where the reference signal received power of the first radio frequency path is greater than a first threshold and the first parameter value of at least one of the second radio frequency paths satisfies a first predetermined condition, controlling a target radio frequency path to switch to the first radio frequency path, wherein the target radio frequency path is a radio frequency path with poorer radio frequency path performance in the two second radio frequency paths;

wherein the two second radio frequency paths are a first polarized path and a second polarized path, and the obtaining a first parameter value of each of the second radio frequency paths comprises:

obtaining a first power margin of the electronic device in the second frequency band, and a second parameter value of each of the second radio frequency paths, wherein the second parameter value is a parameter value measuring a path loss level of the second radio frequency path; and using a sum of the second parameter value of the first polarized path and the first power margin as the first parameter value of the first polarized path; and using the second parameter value of the second polarized path as the first parameter value of the second polarized path;

or, using the second parameter value of the first polarized path as the first parameter value of the first polarized path; and using a difference between the second parameter value of the second polarized path and the first power margin as the first parameter value of the second polarized path.

2. The method according to claim 1, wherein that the first parameter value of at least one of the second radio frequency paths satisfies a first predetermined condition comprises:

the first parameter value of the at least one of the second radio frequency paths is less than a second threshold.

3. The method according to claim 1, wherein the second parameter value of the second radio frequency path comprises at least one of the following:

downlink reference signal received power of the second radio frequency path; or uplink sounding signal received power of the second radio frequency path.

4. The method according to claim 3, wherein the obtaining a first power margin of the electronic device in the second frequency band comprises:

obtaining a second power margin of the first polarized path and a third power margin of the second polarized path; and using a difference between the second power margin and the third power margin as the first power margin of the electronic device in the second frequency band.

5. A chip, wherein the chip comprises a processor and a communication interface, the communication interface is coupled to the processor, and the processor is configured to execute a program or instructions to implement the steps of the radio frequency control method according to claim 1.

6. A computer program product, wherein the computer program product is stored in a non-transient storage medium, and the computer program product is executed by at least one processor so as to implement the steps of the radio frequency control method according to claim 1.

7. An electronic device comprising a processor, a memory, a program or instructions stored in the memory and capable of running on the processor, a first radio frequency path and two second radio frequency paths for transmitting signals; wherein the first radio frequency path is used to transmit signals in a first frequency band, and the second radio frequency paths is used to transmit signals in a second frequency band, and the first frequency band is different from the second frequency band; wherein the program or instructions are executed by the processor to perform:

controlling each of the two second radio frequency paths to transmit radio frequency signals;

obtaining reference signal received power of the first radio frequency path and a first parameter value of each of the second radio frequency paths, wherein the first parameter value is a parameter value capable of measuring radio frequency path performance of the second radio frequency path; and in a case where the reference signal received power of the first radio frequency path is greater than a first threshold and the first parameter value of at least one of the second radio frequency paths satisfies a first predetermined condition, controlling a target radio frequency path to switch to the first radio frequency path, wherein the target radio frequency path is a radio frequency path with poorer radio frequency path performance in the two second radio frequency paths;

wherein the two second radio frequency paths are a first polarized path and a second polarized path, and the obtaining a first parameter value of each of the second radio frequency paths comprises:

obtaining a first power margin of the electronic device in the second frequency band, and a second parameter value of each of the second radio frequency paths, wherein the second parameter value is a parameter value measuring a path loss level of the second radio frequency path; and using a sum of the second parameter value of the first polarized path and the first power margin as the first parameter value of the first polarized path; and using the second parameter value of the second polarized path as the first parameter value of the second polarized path;

or, using the second parameter value of the first polarized path as the first parameter value of the first polarized path; and using a difference between the second parameter value of the second polarized path and the first power margin as the first parameter value of the second polarized path.

8. The electronic device according to claim 7, wherein that the first parameter value of at least one of the second radio frequency paths satisfies a first predetermined condition comprises:

the first parameter value of the at least one of the second radio frequency paths is less than a second threshold.

9. The electronic device according to claim 7, wherein the second parameter value of the second radio frequency path comprises at least one of the following:

downlink reference signal received power of the second radio frequency path; or uplink sounding signal received power of the second radio frequency path.

10. The electronic device according to claim 9, wherein when obtaining a first power margin of the electronic device in the second frequency band, the program or instructions are executed by the processor to perform:

obtaining a second power margin of the first polarized path and a third power margin of the second polarized path; and using a difference between the second power margin and the third power margin as the first power margin of the electronic device in the second frequency band.

11. A non-transitory readable storage medium, wherein the readable storage medium stores a program or instructions; wherein the program or instructions, when executed by a processor of an electronic device that comprises a first radio frequency path and two second radio frequency paths for transmitting signals, cause the electronic device to perform:

controlling each of the two second radio frequency paths to transmit radio frequency signals; wherein the first radio frequency path is used to transmit signals in a first frequency band, and the second radio frequency paths is used to transmit signals in a second frequency band, wherein the first frequency band is different from the second frequency band;

obtaining reference signal received power of the first radio frequency path and a first parameter value of each of the second radio frequency paths, wherein the first parameter value is a parameter value capable of measuring radio frequency path performance of the second radio frequency path; and in a case where the reference signal received power of the first radio frequency path is greater than a first threshold and the first parameter value of at least one of the second radio frequency paths satisfies a first predetermined condition, controlling a target radio frequency path to switch to the first radio frequency path, wherein the target radio frequency path is a radio frequency path with poorer radio frequency path performance in the two second radio frequency paths;

wherein the two second radio frequency paths are a first polarized path and a second polarized path, and the obtaining a first parameter value of each of the second radio frequency paths comprises:

obtaining a first power margin of the electronic device in the second frequency band, and a second parameter value of each of the second radio frequency paths, wherein the second parameter value is a parameter value measuring a path loss level of the second radio frequency path; and using a sum of the second parameter value of the first polarized path and the first power margin as the first parameter value of the first polarized path; and using the second parameter value of the second polarized path as the first parameter value of the second polarized path;

or, using the second parameter value of the first polarized path as the first parameter value of the first polarized path; and using a difference between the second parameter value of the second polarized path and the first power margin as the first parameter value of the second polarized path.

12. The non-transitory readable storage medium according to claim 11, wherein that the first parameter value of at least one of the second radio frequency paths satisfies a first predetermined condition comprises:

the first parameter value of the at least one of the second radio frequency paths is less than a second threshold.

13. The non-transitory readable storage medium according to claim 11, wherein the second parameter value of the second radio frequency path comprises at least one of the following:

downlink reference signal received power of the second radio frequency path; or uplink sounding signal received power of the second radio frequency path.

14. The non-transitory readable storage medium according to claim 13, wherein when obtaining a first power margin of the electronic device in the second frequency band, the program or instructions, when executed by the processor, cause the electronic device to perform:

obtaining a second power margin of the first polarized path and a third power margin of the second polarized path; and using a difference between the second power margin and the third power margin as the first power margin of the electronic device in the second frequency band.

* * * * *